United States Patent [19]

Nakatani et al.

[11] Patent Number: 5,617,781

[45] Date of Patent: Apr. 8, 1997

[54] FOOD STERILIZING APPARATUS

[75] Inventors: Masayuki Nakatani, Nagoya; Koji Sengoku, Chiba-Ken; Akifumi Fujita, Ichihara, all of Japan

[73] Assignee: House Foods Corporation, Higashi-Osaka, Japan

[21] Appl. No.: 490,710

[22] Filed: Jun. 15, 1995

[30] Foreign Application Priority Data

Jun. 16, 1994 [JP] Japan .................................. 6-134656
Jun. 16, 1994 [JP] Japan .................................. 6-134657

[51] Int. Cl.⁶ .................................................. B02C 25/00
[52] U.S. Cl. ................................................. 99/470; 99/361
[58] Field of Search ........................... 99/359, 361, 367, 99/371, 470, 483; 422/26, 295, 308

[56] References Cited

U.S. PATENT DOCUMENTS

| | | | |
|---|---|---|---|
| 2,144,334 | 1/1939 | Kennedy | 99/361 |
| 2,298,693 | 10/1942 | Griffin et al. | 99/371 |
| 4,057,391 | 11/1977 | Yamaguchi | 99/483 |
| 4,169,408 | 10/1979 | Mencacci | 99/367 |
| 4,195,061 | 3/1980 | Kalasek | 422/26 |
| 4,196,225 | 4/1980 | Mencacci . | |
| 4,346,650 | 8/1982 | Zaitsu | 99/367 |
| 4,646,629 | 3/1987 | Creed et al. | 99/361 |
| 4,773,321 | 9/1988 | Wijts . | |
| 4,962,700 | 10/1990 | Skobic et al. | 99/361 |
| 5,452,649 | 9/1995 | Taguchi et al. | 99/361 |
| 5,546,854 | 8/1996 | Nakatani et al. | 99/361 |

FOREIGN PATENT DOCUMENTS

| | | | |
|---|---|---|---|
| 2559354 | 8/1985 | France . | |
| 2528272 | 12/1976 | Germany | 422/295 |
| 49-71177 | 7/1974 | Japan . | |
| 51-42391 | 4/1976 | Japan . | |
| 64-51069 | 2/1989 | Japan . | |
| 4-370081 | 12/1992 | Japan . | |

*Primary Examiner*—David Scherbel
*Assistant Examiner*—Terrence R. Till
*Attorney, Agent, or Firm*—Reid & Priest L.L.P.

[57] ABSTRACT

Food sterilizing apparatus of the present invention includes an air curtain forming means for producing a steam air curtain which prevents ambient air flow into a pressure regulating chamber and a heating and sterilizing chamber. Further, a pressurized fluid tank is fluid connected via a pipe to a pressurized fluid source and the pressure regulating chamber, so that the inner pressure of the pressure regulating chamber can be rapidly increased.

18 Claims, 7 Drawing Sheets

FOOD STERILIZING APPARATUS

BACKGROUND OF THE INVENTION

1. Field of the Invention

This invention relates to a food sterilizing apparatus and, more particularly, it relates to a food sterilizing apparatus adapted to successively feeding food to a food sterilizing chamber for heating and sterilizing the food under pressure higher than the atmospheric pressure.

2. Prior Art

A variety of sterilizing apparatuses are already known for successively feeding food to a food sterilizing chamber for heating and sterilizing the food, including those disclosed in Japanese Patent Laid-Open Publication Nos. 49-71177, 51-42391 and 64-51069.

With any of these sterilizing apparatuses, a conveyor means for advancing the food has to be arranged within the food sterilizing chamber of the apparatus. A conveyor means arranged within a sealed chamber can make the entire configuration of the apparatus rather complicated and is disadvantageous to maintain the chamber in an aseptic condition.

In an attempt to solve the above identified technological problem of the known art, different sterilizing apparatuses have been proposed to successively advance the food in a sealed and heated sterilizing chamber without a conveyor means arranged within the chamber. For example, U.S. patent application Ser. No. 08/395,111 filed on Feb. 27, 1995 and assigned to the assignee of the present application, suggested a food sterilizing apparatus comprising a heater for sterilizing food fed successively thereto at high temperature and under high pressure. The disclosed apparatus additionally comprises a pressure regulating chamber arranged between a food feeding section held in communication with the atmosphere and the heated and pressurized heating vessel (heater). First and second sealing gates are disposed, respectively, between the food feeding section and the pressure regulating chamber and between the pressure regulating chamber and the heating vessel. For advancing food from the food feeding section to the heating vessel, at first, the first sealing gate is opened to make the food feeding section communicate with the pressure regulating chamber and food is brought into the pressure regulating chamber while the second sealing gate is closed and the pressure regulating chamber does not communicate with the heating vessel. Secondly, the first sealing gate is closed to sealedly isolate the pressure regulating chamber and raise the inner pressure (or both the inner pressure and the temperature) of the pressure regulating chamber to the level of the inner pressure (or both the inner pressure and the temperature) of the heating vessel. Then, the second sealing gate is opened to make the pressure regulating chamber communicate with the heating vessel, keeping the first sealing gate under a closed condition, and foods are fed into the hot and pressurized heating vessel for sterilization.

With the above arrangement, the time required for the inner pressure (or both the inner pressure and the temperature) of the pressure regulating chamber to be raised to the level of the inner pressure (or both the inner pressure and the temperature) of the heating vessel for each operation (hereinafter referred to stand-by time) is useless and wasteful in terms of the productivity of the apparatus because it is not used for feeding foods from the food feeding section into the heating vessel. The inner pressure (or both the inner pressure and the temperature) of the pressure regulating chamber is regulated by introducing the steam through a pipe connected to a steam source such as a boiler. On the pipe, there is provided a pressure-reducing valve and a control valve. The steam to be fed into the pressure regulating chamber from the vapor source under pressure is reduced to a predetermined level by a pressure-reducing valve and fed into the pressure regulating chamber when the control valve is opened.

With such an arrangement, however, the steam source is inevitably separated away from the pressure regulating chamber and hence it takes considerable time for the inner pressure of the pressure regulating chamber to be raised to the level of the inner pressure of the heating vessel. This stand-by time provides a major drawback in the operation of the food sterilizing apparatus from the viewpoint of efficiency and productivity.

Additionally, after feeding a given number of foods into the heating vessel, the second sealing gate is closed to sealedly close the pressure regulating chamber and then the inner pressure of the pressure regulating chamber is reduced to level of atmospheric pressure by means of a pressure reducing means such as a valve. Then, the first sealing gate is opened to receive the food from the food feeding section within the pressure regulating chamber.

Since the food feeding section is in communication with the atmosphere and the pressure regulating chamber is also held to the atmospheric pressure, ambient air can easily flow into the pressure regulating chamber once the first sealing gate separating the food feeding section and the pressure regulating chamber is opened. As a result, the temperature of the pressure regulating chamber can be lowered by ambient air flowing into the chamber to further increase the stand-by time required to raise the pressure and the temperature of the pressure regulating chamber to the respective levels of those of the heating vessel and reduce the efficiency of the operation of the apparatus.

Further, the ambient air flowed into the pressure regulating chamber is flowed into the heating vessel and obstructs the contact of the vapor to the food and lowers the efficiency of the sterilization.

SUMMARY OF THE INVENTION

In view of the above problems, it is therefore an object of the present invention to provide a food sterilizing apparatus that can reduce the stand-by time and improve the efficiency of operation of the apparatus by reducing the time required for regulating the inner pressure (or both the inner pressure and the temperature) of the pressure regulating chamber of the apparatus.

It is another object of the invention to provide a food sterilizing apparatus that can further reduce the stand-by time and increase the handling speed by feeding pressurized fluid to the pressure regulating chamber in an efficient way and consequently reduce the time required for regulating the inner pressure (or both the inner pressure and the temperature) of the pressure regulating chamber of the apparatus.

It is still another object of the invention to provide a food sterilizing apparatus that can further reduce the stand-by time and increase the handling speed by completely or partly blocking any inflow of ambient air into the pressure regulating chamber of the apparatus.

According to the invention, the above objects are achieved by providing a food sterilizing apparatus comprising a food feeding section in communication with the atmosphere and a heating and sterilizing chamber for heating and sterilizing food under pressure higher than the atmospheric pressure, said food feeding section and said heating and sterilizing chamber being continuously arranged, wherein a pressure upward regulating chamber is provided between said food feeding section and said heating and sterilizing chamber and said pressure upward regulating chamber is connected to a downstream portion of said food feeding section via a first sealing gate and an upstream portion of said heating and sterilizing chamber via a second sealing gate and said pressure upward regulating chamber is connected to a pressurized fluid supply source for supplying pressurized fluid and a pressurized fluid tank is disposed on a pressurized fluid supply pipe which connects said pressurized fluid supply source and said pressure upward regulating chamber.

According to the invention, there is also provided a food sterilizing apparatus comprising a food feeding section in communication with the atmosphere and a pressure upward regulating chamber and a heating and sterilizing chamber for heating and sterilizing food under pressure higher than the atmospheric pressure, said food feeding section and said pressure upward regulating chamber and said heating and sterilizing chamber being continuously connected, said food being contained in open containers having an opening and advanced successively from said food feeding section to said heating and sterilizing chamber, wherein a downstream portion of said food feeding section is connected to said pressure upward regulating chamber by way of a sealing gate and an upstream portion of said heating and sterilizing chamber is connected to said pressure upward regulating chamber by way of another sealing gate and that said pressure upward regulating chamber is connected to a pressurized fluid supply source for supplying pressurized fluid and a pressurized fluid tank is disposed on a pressurized fluid supply pipe which connects said pressurized fluid supply source and said pressure upward regulating chamber.

According to the invention, there is also provided a food sterilizing apparatus comprising a food feeding section in communication with the atmosphere, a pressure upward regulating chamber, a heating and sterilizing chamber for heating and sterilizing food under pressure higher than the atmospheric pressure, a cooling chamber for cooling the heated and sterilized food, a pressure downward regulating chamber and a delivery section for discharging food, arranged successively and connected by way of respective sealing gates, said food being contained in rigid containers having an opening and advanced successively from said food feeding section to said heating and sterilizing chamber, wherein said food feeding section, said heating and sterilizing chamber, said cooling chamber and said delivery section are arranged perpendicularly relative to or in parallel with each other and said food feeding section, said pressure upward regulating chamber, said heating and sterilizing chamber, said cooling chamber, said pressure downward regulating chamber and said delivery section are provided at respective upstream portions thereof with a pusher device for pushing downstream said rigid containers, respectively, each of pusher devices having a stroke equal to or greater than the width of a rigid container, and that said pressure upward regulating chamber is provided with a pressurized fluid supply source for supplying pressurized fluid and a pressurized fluid tank disposed between said pressurized fluid supply source and said pressure upward regulating chamber.

According to the invention, there is also provided a food sterilizing apparatus comprising a food feeding section in communication with the atmosphere and a heating and sterilising chamber for heating and sterilizing food under pressure higher than the atmospheric pressure, said food feeding section and said heating and sterilizing chamber being continuously arranged, wherein further comprises an pressure upward regulating chamber arranged between said food feeding section and said heating and sterilizing chamber and connected to a downstream portion of said food feeding section by way of a first sealing gate and to an upstream portion of said heating and sterilizing chamber by way of a second sealing gate and a steam air curtain forming means arranged at the food feeding section side of said first sealing gate.

According to the invention, there is also provided a food sterilizing apparatus comprising a food feeding section in communication with the atmosphere, a pressure upward regulating chamber, a heating and sterilizing chamber for heating and sterilizing food under pressure higher than the atmospheric pressure, a cooling chamber for cooling the heated and sterilized food, a pressure downward regulating chamber and a delivery section for discharging food, arranged successively and connected by way of respective sealing gates, said food being contained in rigid containers having an opening and advanced successively from said food feeding section to said heating and sterilizing chamber, wherein said food feeding section, said heating and sterilizing chamber, said cooling chamber and said delivery section are arranged perpendicularly relative to or in parallel with each other and said food feeding section, said pressure upward regulating chamber, said heating and sterilizing chamber, said cooling chamber, said pressure downward regulating chamber and said delivery section are provided at respective upstream portions thereof with a pusher device for pushing downstream said rigid containers, each of pusher devices having a stroke equal to or greater than the width of a rigid container, and wherein it further comprises a steam air curtain forming means arranged at the food feeding section side of said first sealing gate between said food feeding section and said pressure upward regulating chamber.

BRIEF DESCRIPTION OF THE INVENTION

DETAILED DESCRIPTION OF THE PREFERRED EMBODIMENTS

Figure 1:
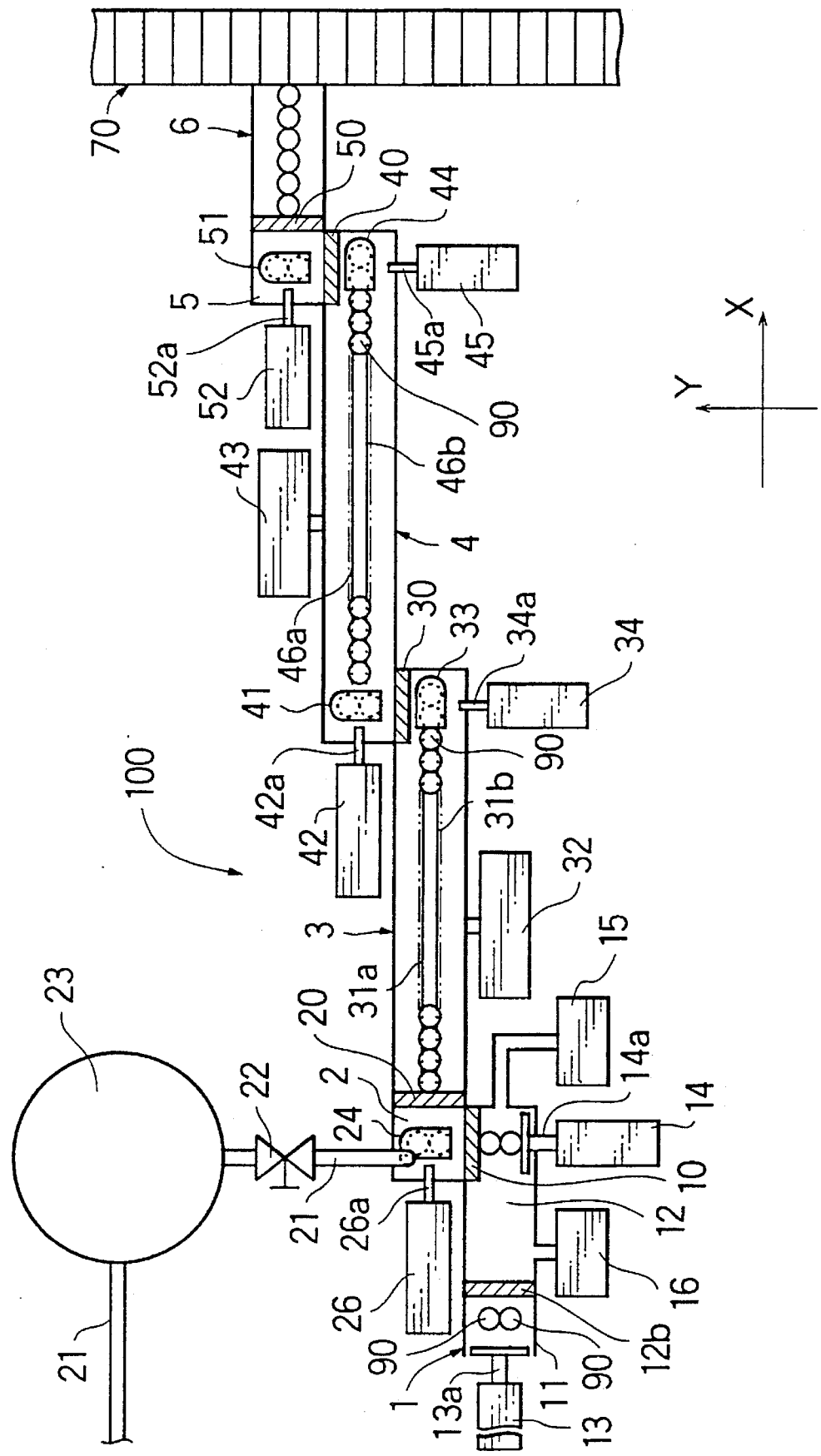
FIG. 1 is a schematic plan view of a first embodiment of food sterilizing apparatus according to the invention, showing its overall configuration.

Now, the invention will be described by referring to the accompanying drawings that illustrate preferred embodiments of the invention.

Firstly, a first embodiment will be described by referring to FIGS. 1 through 5, where the food sterilizing apparatus is generally denoted by reference numeral 100.

Figure 2:
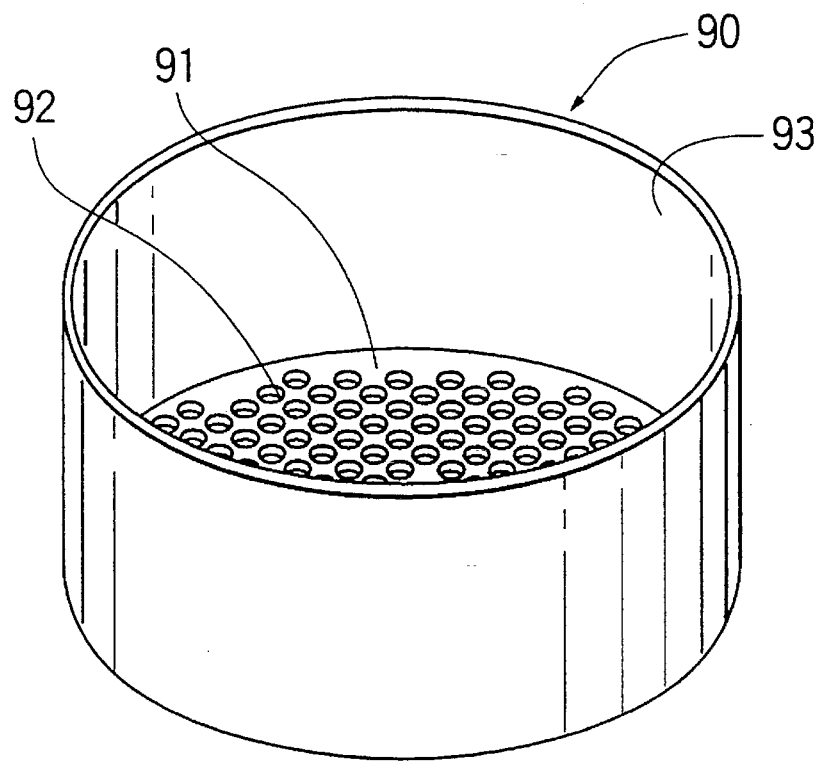
FIG. 2 is a schematic perspective view of a tray for containing food that can be used for the first through third embodiments of food sterilizing apparatus according to the invention.

The food sterilizing apparatus 100 of this embodiment is designed to heat and sterilize solid food, such as boiled rice, cooked noodles, or the solid ingredients of stew or curry (e.g., vegetables), to be packed in retort pouches at a later stage, contained directly in rigid trays 90 or other containers. FIG. 2 schematically illustrates a tray adapted for use in the embodiment. The tray 90 is hollow and cylindrical and typically made of metal such as stainless steel. It has an open top 93 and a closed bottom and is designed to carry a predetermined volume of food (e.g., one portion of boiled rice). As a plurality of trays 90 successively pass through the food sterilizing apparatus 100, the food in the trays is heated and sterilized.

The bottom plate 91 of the tray 90 is provided with a number of small through bores 92 distributed over the entire area of the bottom plate 91. The size of the through bores 92 is so selected that the food placed on the bottom plate 92 of the tray 90 may not fall therethrough. Steam or other heating and sterilizing fluid may freely pass the bottom plate through the small through bores 92 to get to the entire surface of the food on the bottom plate 91.

The main body of the food sterilizing apparatus 100 has a configuration as described below. Referring to FIG. 1, the food sterilizing apparatus 100 comprises, from the upstream end thereof, a food feeding section 1 held in communication with the atmosphere and designed to receive trays 90 containing food to be sterilized, a heating and sterilizing chamber 3 for heating and sterilizing food under pressure higher than the atmospheric pressure, a cooling chamber 4 for cooling the heated and sterilized food and a delivery section 6 for discharging the cooled food out of the food sterilizing apparatus 100.

The food feeding section 1 by turn comprises a receiving section 11 located at the upstream extremity of the apparatus in order to receive the food containing trays 90 and a preheating chamber 12 located downstream of the receiving section 11 in order to preheat the food in the trays 90 under the atmospheric pressure. A pressure upward regulating chamber 2 is disposed upstream of the heating and sterilizing chamber 3 and separated therefrom by a second gate valve 20, whereas a pressure downward regulating chamber 5 is disposed upstream of the delivery section 6 and separated therefrom by a fifth gate valve 50.

The preheating chamber 12 located in a downstream area of the food feeding section 1 is connected to the pressure upward regulating chamber 2 located in an upstream area of the heating and sterilizing chamber 3 by way of a first gate valve 10. The heating and sterilizing chamber 3 is connected at a downstream portion thereof to an upstream area of the cooling chamber 4 via a third gate valve 30. The cooling chamber 4 is connected at a downstream portion thereof to the pressure downward regulating chamber 5 located upstream relative to the delivery section 6. Thus, trays 90 introduced into the food sterilizing apparatus 100 through the receiving section 11 of the food feeding section 1 are moved by pusher devices 13, 14, 26, 34, 42, 45 and 52 to the delivery section 6 by way of the preheating chamber 12, the pressure upward regulating chamber 2, the heating and sterilizing chamber 3, the cooling chamber 4 and the pressure downward regulating chamber 5.

A pair of trays 90, 90 containing food to be sterilized are placed in juxtaposition in the receiving section 11 of the food feeding section 1 by a feeding means (not shown). The receiving section 11 is provided at an upstream portion thereof with a first pusher device 13 for moving downstream (in direction X) the paired trays 90, 90. The first pusher device 13 is provided with a T-shaped extendible pusher rod 13a, which pusher rod 13a is extendible and has a stroke that enables it to push the juxtaposed trays 90, 90 downstream (in direction X) in the food feeding section 1 to the downstream end of the preheating chamber 12.

The preheating chamber 12 is provided outside the downstream end thereof with a second pusher device 14. More specifically, the second pusher device 14 is arranged opposite to the pressure upward regulating chamber 2 with the downstream end of the preheating chamber 12 disposed therebetween. Like the first pusher device 13, the second pusher device 14 is provided with a T-shaped extendible pusher rod 14a, which pusher rod 14a is extendible in a direction (in direction Y) perpendicular to the general direction of movement of trays 90, 90 toward the pressure upward regulating chamber 2. The rod 14a has a stroke that enables it go into the downstream end of the preheating chamber 12 and push the juxtaposed trays 90, 90 that arrive the downstream end of the preheating chamber 12 under the pushing effect of the first pusher device 13 this time in a single row along the direction Y into a turn table provided in the pressure upward regulating chamber 2.

The preheating chamber 12 is open to the atmosphere and therefore held under the atmospheric pressure and has a shape and dimensions adapted to guide a pair of juxtaposed trays 90, 90 downstream.

Figure 3:
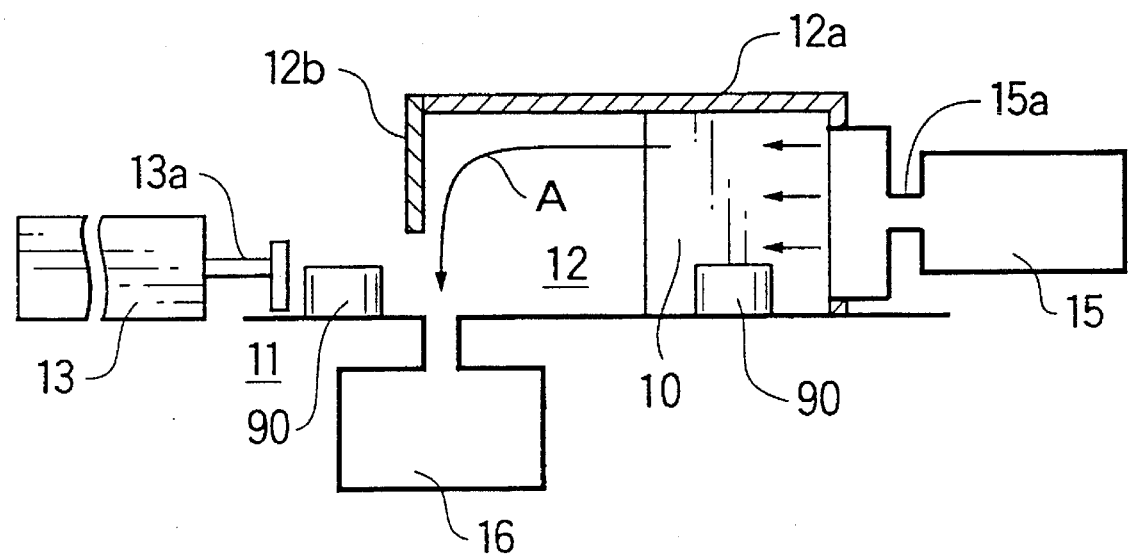
FIG. 3 is a schematic plan view of the preheating chamber of the first embodiment of food sterilizing apparatus according to the invention.

The preheating chamber 12 is additionally provided with a steam supply means 15 and a deaerating means 16 as schematically shown in FIG. 1. The steam supply means 15 and the deaerating means 16 cooperate to serve as steam air curtains forming means and the preheating means. As schematically shown in FIG. 3, the steam supply means 15 is located at the downstream end of the preheating chamber 12 or in the vicinity of the first gate valve 10 separating the preheating chamber 12 and the pressure upward regulating chamber 2 and supply steam into the preheating chamber 12 through a blow out port 15a and along the lateral wall of the preheating chamber 12 where the gate valve 10 is arranged. On the other hand, the deaerating means 16 is located at an upstream portion of the preheating chamber 12 to exhaust the steam and/or the air from the preheating chamber 12.

The preheating chamber 12 is covered at the top thereof by the an upper plate 12a. The upper plate 12a is connected at the upstream end thereof with a hanging section 12b, which is disposed vis-a-vis the stream blow out port 15a of the steam supply means 15 and operates as a deflector for deflecting (directing) the steam blown out of the steam blow out port 15a toward the deaerating means 16. As shown in FIG. 3, a gap is provided between the lower end of the hanging section 12b and the bottom of the preheating chamber 12 for allowing trays 90, 90 to pass therethrough.

With the above arrangement, a stream of steam air curtain by steam is produced from the downstream end to the upstream end of the preheating chamber 12 along the lateral wall of the preheating chamber 12 where the gate valve 10 is arranged as indicated by arrow A in FIG. 3, so that the ambient air is prevented from flowing into the pressure upward regulating chamber 2. In addition, since the air-curtain by steam is also formed downward of the hanging section 12b, the ambient air is prevented from flowing into the preheating chamber 12.

The above arrangement may be so modified that the steam supply means 15 and the deaerating means 16 are vertically disposed on the preheating chamber 12 so as to face with each other.

The pressure upward regulating chamber 2 is connected at an upper portion thereof with a steam supply pipe 21 for feeding steam. The steam supply pipe 21 is in turn connected to a steam supply source (not shown) by way of a control valve 22 and a steam tank 23 (pressurized fluid tank) for storing steam. As steam is generated in the steam supply source and fed to the pressure upward regulating chamber 2 by way of the steam supply pipe 21, the inner pressure and the temperature of the pressure upward regulating chamber 2 can be raised to the respective levels of the inner pressure and the temperature of the heating and sterilizing chamber 3. The steam tank 23 is designed to temporarily store steam from the steam supply source and preferably has a capacity (volume) 5 to 50 times, more preferably 10 to 30 times greater than the capacity of the pressure upward regulating chamber 2. The pressure of steam in the steam tank 23 is preferably between 0.5 and 3.0 kg/cm$^2$ and more preferably between 1.0 and 2.5 kg/cm$^2$ gauge pressure. The control valve 22 is designed to control the supply of steam to the pressure upward regulating chamber 2 by its ON/OFF action realized under the control of a control device (not shown). A turn table 24 is arranged within the pressure upward regulating chamber and rotatable around a vertical axis Z (see FIGS. 4 and 5). The turn table itself is a substantially rectangularly parallelepipedic cabinet-like hollow body which is open at a longitudinal lateral side and dimensioned so as to contain a pair of trays in a row. Thus, a pair of trays 90, 90 can move into and out of the turn table 24 through the open side (open area 24b). A substantially circular hole 24a is cut through the lateral wall opposite to the open side of the turn table 24.

The top plate 24c of the turn table 24 covers the open tops of the trays 90, 90 housed in the turn table 24. More specifically, the top plate 24c is located between the open end 21a of the steam supply pipe 21 in the pressure upward regulating chamber 2 and the open tops 93, 93 of the trays 90, 90 housed in the turn table 24, so that it effectively prevents steam blown out of the open end 21a of the pipe 21 from directly entering the trays 90, 90 through the open tops 93, 93.

The turn table 24 is provided at the bottom thereof with a rotary shaft 25 so that it may rotate around said rotary shaft 25 by a predetermined angle. More specifically, the turn table 24 rotates by 90° between a first position where the open side area 24b faces the preheating chamber 12 and a second position where the open side area 24b faces the heating and sterilizing chamber 3. In the first position of the turn table 24, a pair of trays 90, 90 can be housed in the turn table 24 as they are pushed forward toward the pressure upward regulating chamber 2 (in direction Y) by the second pusher device 14, whereas, in the second position, the pair of trays 90, 90 housed in the turn table 24 can be pushed into the heating and sterilizing chamber 3 from the turn table 24 through the open side area 24b thereof by a third pusher device 26, which will be described hereinafter.

Figure 5:
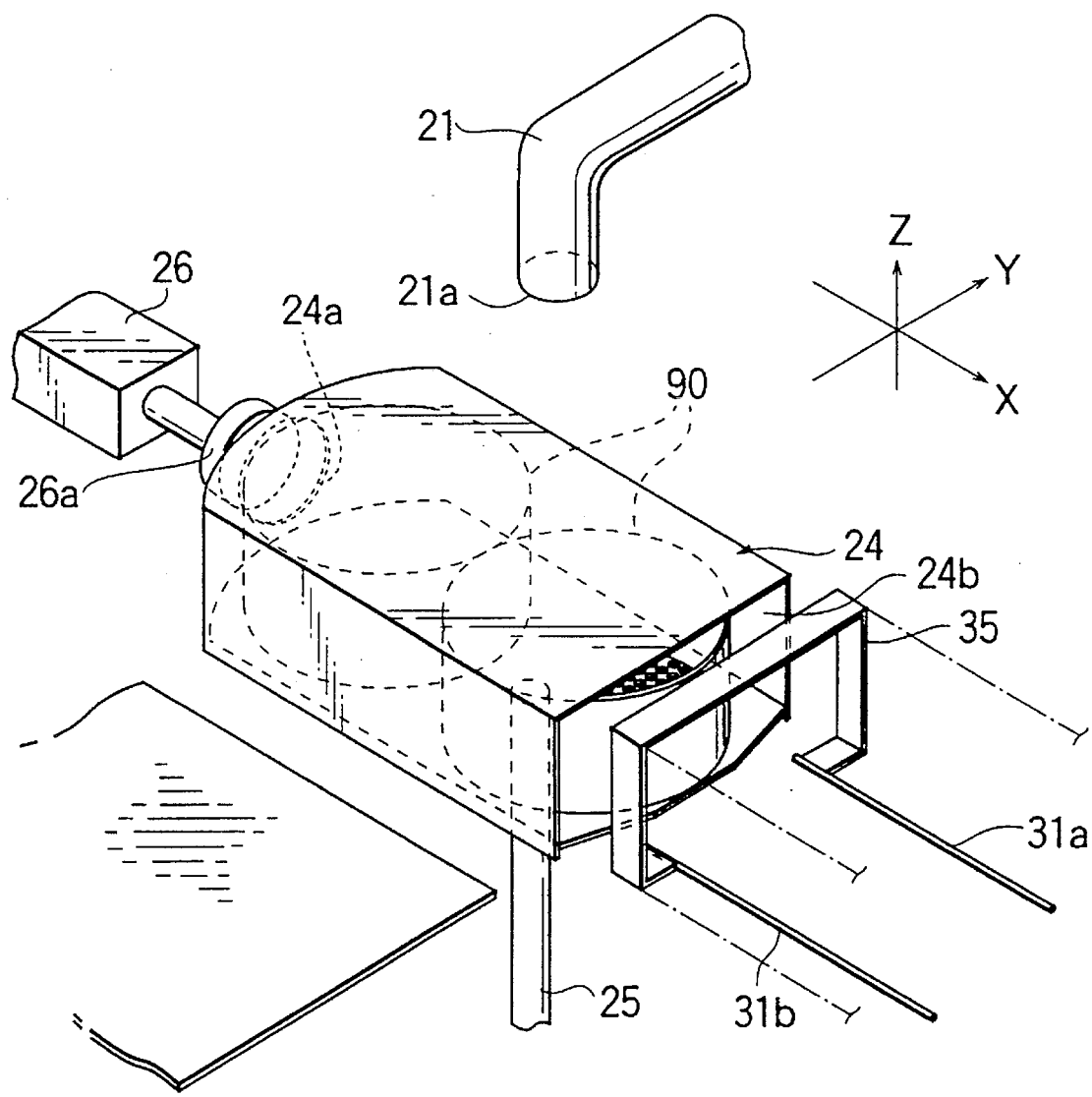
FIG. 5 is a schematic perspective view of the turn table arranged in the pressure upward regulating chamber of the first embodiment of food sterilizing apparatus according to the invention, showing the turn table placed in a second position.

Outside the pressure upward regulating chamber 2 and at the side thereof disposed opposite to the heating and sterilizing chamber 3, there is provided a third pusher device 26 for pushing out a pair of trays 90, 90 housed in the turn table 24 into the heating and sterilizing chamber 3 when the turn table 24 is disposed in its second position as shown in FIG. 5. The third pusher device 26 is provided with an extendible pusher rod 26a, which is so shaped and dimensioned that it can move through the hole 24a cut through a wall of the turn table 24. The extendible pusher rod 26a has a stroke long enough to push out a pair of trays 90, 90 housed in the turn table 24 and arranged in a row as shown in FIG. 5 into the heating and sterilizing chamber 3.

The heating and sterilizing chamber 3 is located downstream of the pressure upward regulating chamber 2 and has a substantially cylindrical and oblong inner space, where a pair of rails 31a and 31b are arranged in parallel with a given distance separating them from each other and extending longitudinally over the entire length of the chamber 3. The pair of trays 90, 90 pushed out of the pressure upward regulating chamber 2 and forced into the heating and sterilizing chamber 3 by the third pusher device 26 are then moved downstream on the rails 31a and 31b, the distance separating the rails 31a and 31b being so selected for them to appropriately support the bottoms of the moving trays 90, 90. The rails 31a and 31b are provided with a number of guide members 35 arranged with a predetermined distance separating any adjacent ones so that the trays 90, 90 can safely and smoothly move along the rails 31a and 31b. In shorts, the rails 31a and 31b and the guide members 35 constitute a tray transfer route for advancing trays into the heating and sterilizing chamber 3 in a row.

The heating and sterilizing chamber 3 is provided with a heating and sterilizing means 32 for maintaining the inner pressure and the temperature of the heating and sterilizing chamber 3 to predetermined respective levels. The heating and sterilizing means 32, which is schematically illustrated in FIG. 1, feeds steam to the heating and sterilizing chamber 3 to maintain the inner pressure and the temperature of the heating and sterilizing chamber 3 to 0.45–2.65 kg/cm$^2$, preferably to 1.00–2.15 kg/cm$^2$ (gauge pressure), and 120°–135° C. respectively.

The heating and sterilizing chamber 3 is provided at the downstream end thereof with a turn table 33 similar to the one arranged in the pressure upward regulating chamber 2. The heating and sterilizing chamber 3 is additionally provided outside and at the side thereof disposed opposite to the cooling chamber 4 with a fourth pusher device 34 similar to the third device 26. The turn table 33 and the pusher device 34 operate like the turn table 24 and the third pusher device 26, respectively. As described above, the heating and sterilizing chamber 3 is connected at the downstream end thereof to the upstream end of the cooling chamber 4 arranged in parallel with the heating and sterilizing chamber by way of a gate valve 30.

The cooling chamber 4 is provided at the upstream end thereof with a turn table 41 similar to the one arranged in the pressure upward regulating chamber 2. The cooling chamber 4 is additionally provided near the upstream end thereof with a fifth pusher device 42 similar to the third pusher device 26. The turn table 41 and the pusher device 42 operate like the turn table 24 and the third pusher device 26 respectively.

The cooling chamber 4 has a configuration similar to that of the heating and sterilizing chamber 3. It has a substantially cylindrical and oblong inner space, where a pair of rails 46a and 46b are arranged in parallel with a given distance separating them from each other and extending longitudinally over the entire length of the chamber. The pair of trays carried in a row by the turn table 41 are advanced downstream on the rails 46a and 46b, the distance separating the rails 46a and 46b being so selected for them to appropriately support the bottoms of the moving trays 90, 90. The rails 46a and 46b are provided with a number of guide members similar to the guide members 35 described above and arranged with a predetermined distance separating any adjacent ones so that the trays 90, 90 can safely and smoothly move along the rails 46a and 46b.

The cooling chamber 4 is provided with a cooling means 43 for maintaining the inner pressure and the temperature of the cooling chamber 4 to predetermined respective levels. The cooling means 43, which is schematically illustrated in FIG. 1, for example, feeds air at 80° C. to the cooling chamber 4 to maintain the inner pressure and the temperature of the cooling chamber 4 to 1.8 kg/cm$^2$ and 80° C., respectively.

The cooling chamber 4 is provided at the downstream end thereof with a turn table 44 similar to the one arranged in the pressure upward regulating chamber 2. The cooling chamber 4 is additionally provided near the downstream end thereof with a sixth pusher device 45 similar to the third pusher device 26. The turn table 44 and the sixth pusher device 45 operate like the turn table 24 and the third pusher device 26, respectively.

The pressure downstream regulating chamber 5 is arranged in parallel with and connected to the downstream end of the cooling chamber 4 by way of a gate valve 40 and has a configuration similar to that of the pressure upward regulating chamber 2. More specifically, it is provided with a turn table 51 for receiving a pair of trays 90, 90 arranged in a row and coming from the cooling chamber 4 and a seventh pusher device 52 for moving the trays 90, 90 housed in the turn table 51 in a row into the delivery section 6. The pressure downward regulating chamber 5 differs from the pipe 21 of the latter is replaced with an air supply pipe (not shown).

The delivery section 6 is provided at the downstream side thereof with a conveying means 70 such as a belt conveyor. The sterilized food that has been moved to the delivery section in trays 90 is then sent to a packaging station (not shown). Note that the delivery section 6, the conveying means 70 and the packaging station are housed in a clean room. At the packaging station, the food is taken out of the trays 90 and packed in sterilized containers which is package for finishing product, the containers are then sealed air-tight after, if necessary, having been filled with sterilized liquid food.

For the purpose of the invention, the term "steam" includes saturated steam and super heated steam and other vapors used for heating and sterilization.

The above described food sterilizing apparatus 100 operates in a manner as described below.

The food contained in trays 90, 90 supplied by a supply means (not shown) are received by the receiving section 11 of the food feeding section 1 such that a pair at a time of juxtaposed trays 90, 90 are arranged in the receiving section 11. Then the first pusher device 13 is operated to move the juxtaposed trays 90, 90 to the downstream end of the preheating chamber 12 by means of the pusher rod 13a.

Since steam is supplied to the inside of the preheating chamber 12 by the steam supply means 15, the air that fills the gaps existing in the food e.g. gaps among the grains of rice, housed in the trays 90, 90 is replaced with steam to preheat the food while the food is advancing forward in the preheating chamber 12.

Figure 4:
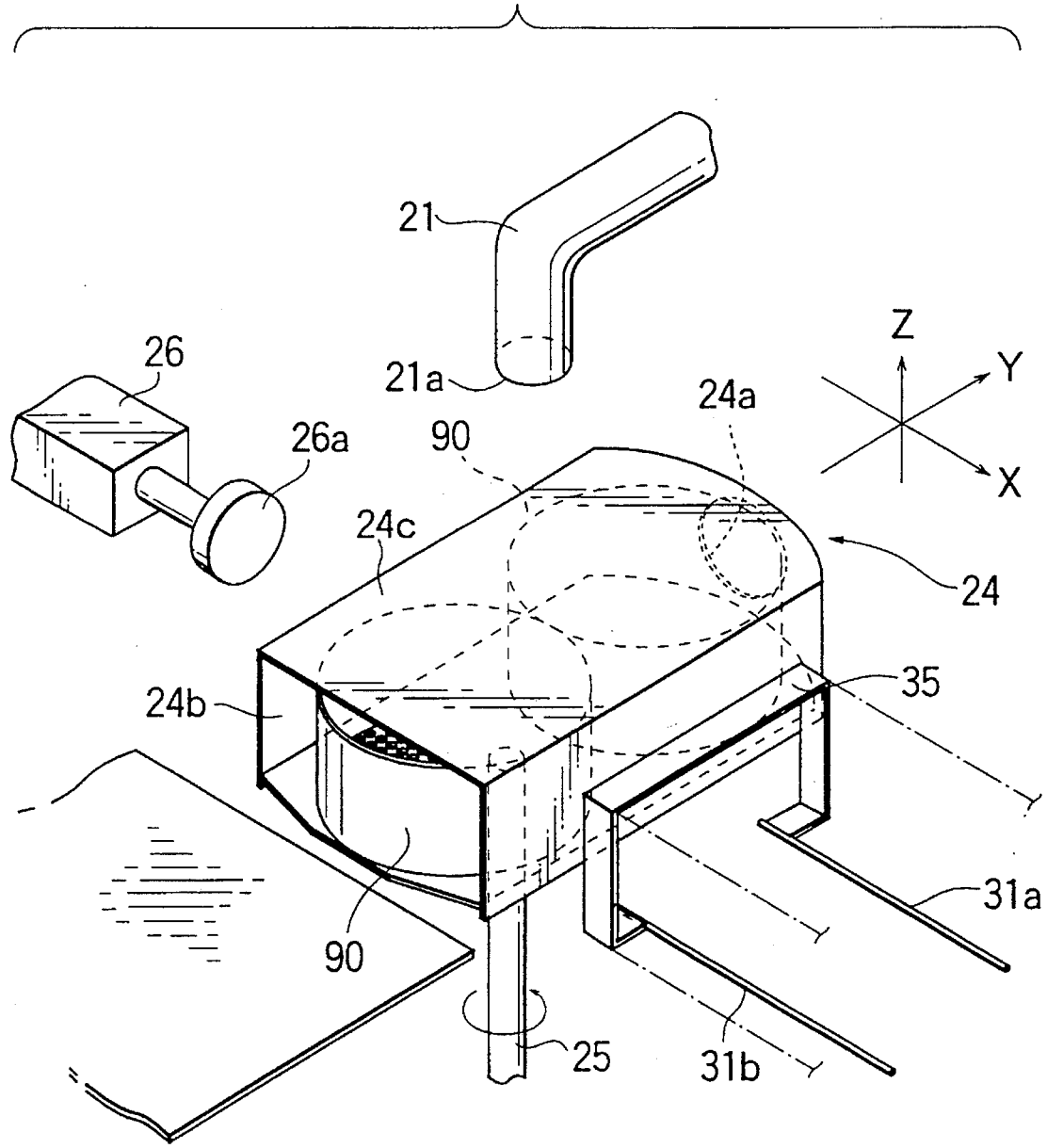
FIG. 4 is a schematic perspective view of the turn table arranged in the pressure upward regulating chamber of the first embodiment of food sterilizing apparatus according to the invention, showing the turn table placed in a first position.

Then, the first gate valve 10 is opened to make the pressure upward regulating chamber 2 communicate with the preheating chamber 12, while the second gate valve 20 is kept closed, and the turn table 24 is put to its first position as shown in FIGS. 1 and 4.

Under this condition, although the inside of the pressure upward regulating chamber 2 is held to the atmospheric pressure by a pressure reducing means (not shown), no cool air will flow from the preheating chamber 12 to the pressure upward regulating chamber 2 because of the steam air curtain formed along the lateral side of preheating chamber 12 where the first gate valve 10 is arranged.

Then, the pusher rod 14a of the second pusher device 14 is extended to push the trays 90, 90 arranged in juxtaposition at the downstream end of the preheating chamber 12 into the turn table 24 in a row running along the pressure upward regulating chamber 2. While the rear tray 90 may ride on the front tray 90 under this condition, the top plate 24c of the turn table 24 prevents such a riding motion from taking place.

Thereafter, the pusher rod 14a is contracted and the turn table 24 is rotated counterclockwise by 90° to its second position as illustrated in FIG. 5. Simultaneously or subsequently, the first gate valve 10 is shut to bring the pressure upward regulating chamber 2 into a closed state and then the control valve 22 is opened to allow steam to flow into the pressure upward regulating chamber 2 from the tank 23 until the inner pressure of the pressure upward regulating chamber becomes equal to that of the heating and sterilizing chamber 3. Since the top plate 24c of the turn table 24 covers the openings 93, 93 of the trays 90, 90, steam bursting out of the open end 21a of the pipe 21 would not directly hit the food in the trays 90, 90 and blow it away.

Then, the second gate valve 20 is opened and the third pusher device 26 is operated to extend the pusher rod 26a, which in turn pushes the trays 90, 90 in the turn table 24 into the tray transfer route in the heating and sterilizing chamber 3. Since the heating and sterilizing chamber 3 is already filled with trays on the transfer route as a result of preceding cycles, the frontmost pair of trays on the transfer route are pushed into the turn table 33 by the newly arrived pair of trays 90, 90 that are pushed onto the transfer route. The open lateral side of the turn table 33 has been directed to the transfer route of the heating and sterilizing chamber 3 to receive the pair of trays 90, 90 pushed out of the heating and sterilizing chamber 3.

Meanwhile, after the trays 90, 90 are pushed out of the turn table 24, the second gate valve 20 is closed and the inner pressure of the pressure upward regulating chamber 2 is reduced to the level of the atmospheric pressure by a pressure reducing means (not shown). Then, the first gate valve 10 is opened, and next pair of trays 90, 90 are introduced into the pressure upward regulating chamber 2.

Thereafter, the turn table 33 is rotated clockwise by 90° and the third gate valve 30 is opened, while the fourth pusher device 34 is operated to extend the pusher rod 34a and push the trays 90, 90 in the turn table 33 toward the cooling chamber 4 until the trays are put into the turn table 41 having its open lateral side directed to the fourth pusher device 34.

Then, the third gate valve 30 is closed and the turn table 41 is rotated counterclockwise by 90° until the open lateral side of the turn table 41 is directed to the transfer route of the cooling chamber 4. Subsequently, the fifth pusher device 42 is operated to extend the pusher rod 42a and push the pair of trays 90, 90 on the turn table 41 onto the transfer route in the cooling chamber 4. Since the cooling chamber 4 is already filled with trays on the transfer route as a result of preceding cycles, the frontmost pair of trays on the transfer route are pushed into the turn table 44 having its open lateral side directed to the transfer route by the newly arrived pair of trays 90, 90 that are pushed onto the transfer route by the fifth pusher device 42 as in the case of the heating and sterilizing chamber 3.

Now, the turn table 44 is rotated clockwise by 90° C. Then, the fifth gate valve 50 is closed and, while keeping the open lateral side of the turn table 51 directed to the cooling chamber 4 (as shown in FIG. 1), air is supplied to the pressure downward regulating chamber 5 from the air supply pipe until the inner pressure of the pressure downward regulating chamber 5 gets to the level of that of the cooling chamber 4. Then, the fourth gate valve 40 is opened to make the pressure downward regulating chamber 5 communicate with the cooling chamber 4 and the sixth pusher device 45 is operated to extend the pusher rod 45a and push the trays 90, 90 housed in the turn table 44 in a row into the turn table 51.

Thereafter, the pusher rod 45a of the sixth pusher device 45 is contracted to its original position and the turn table 51 is rotated counterclockwise by 90° so that its open lateral side of the turn table is directed to the delivery section 6. Simultaneously or subsequently, the fourth gate valve 40 is shut to bring the pressure downward regulating chamber 5 into a closed state and then the pressure reducing means (not shown) such as a valve is opened to allow the inner pressure of the pressure downward regulating chamber 5 to fall to the level of the atmospheric pressure.

Then, the fifth gate valve 50 is opened and the seventh pusher device 52 is operated to extend the pusher rod 52a and push the trays 90, 90 housed in the turn table 51 in a row into the delivery section 6.

The trays 90, 90 moved into the delivery section are then transferred to a subsequent station (not shown) for packaging by means of the belt conveyor 70.

It will be seen from the table below that the time required for raising the inner pressure of the pressure upward regulating chamber is remarkably reduced to improve the efficiency of the operation of the apparatus through the use of a steam tank 23.

TABLE 1

|  | with tank | without tank |
|---|---|---|
| pressure regulating time | less than 1 sec. | circa 20 sec. |
| cycle time | 8.5 sec. | 20 sec. |
| handling rate | circa 850 trays per hour | circa 360 trays per hour |

Without a steam tank, it takes about 20 seconds to regulate the inner pressure of the pressure upward regulating chamber in a single cycle of operation, whereas the time for regulating the pressure is reduced to only 1 second, if a steam tank is installed, to raise the tray handling rate from 360 trays to 850 trays per hour.

Now, a second embodiment of food sterilizing apparatus will be described by referring to FIG. 6. Since the food sterilizing apparatus 200 of this embodiment is substantially similar to the food sterilizing apparatus 100 of the first embodiment, only the difference between the two embodiments will be described hereinafter and the components similar to those of the first embodiment will be denoted by the same reference numerals that are prefixed by 2 or 20 and their descriptions will be omitted.

Figure 6:
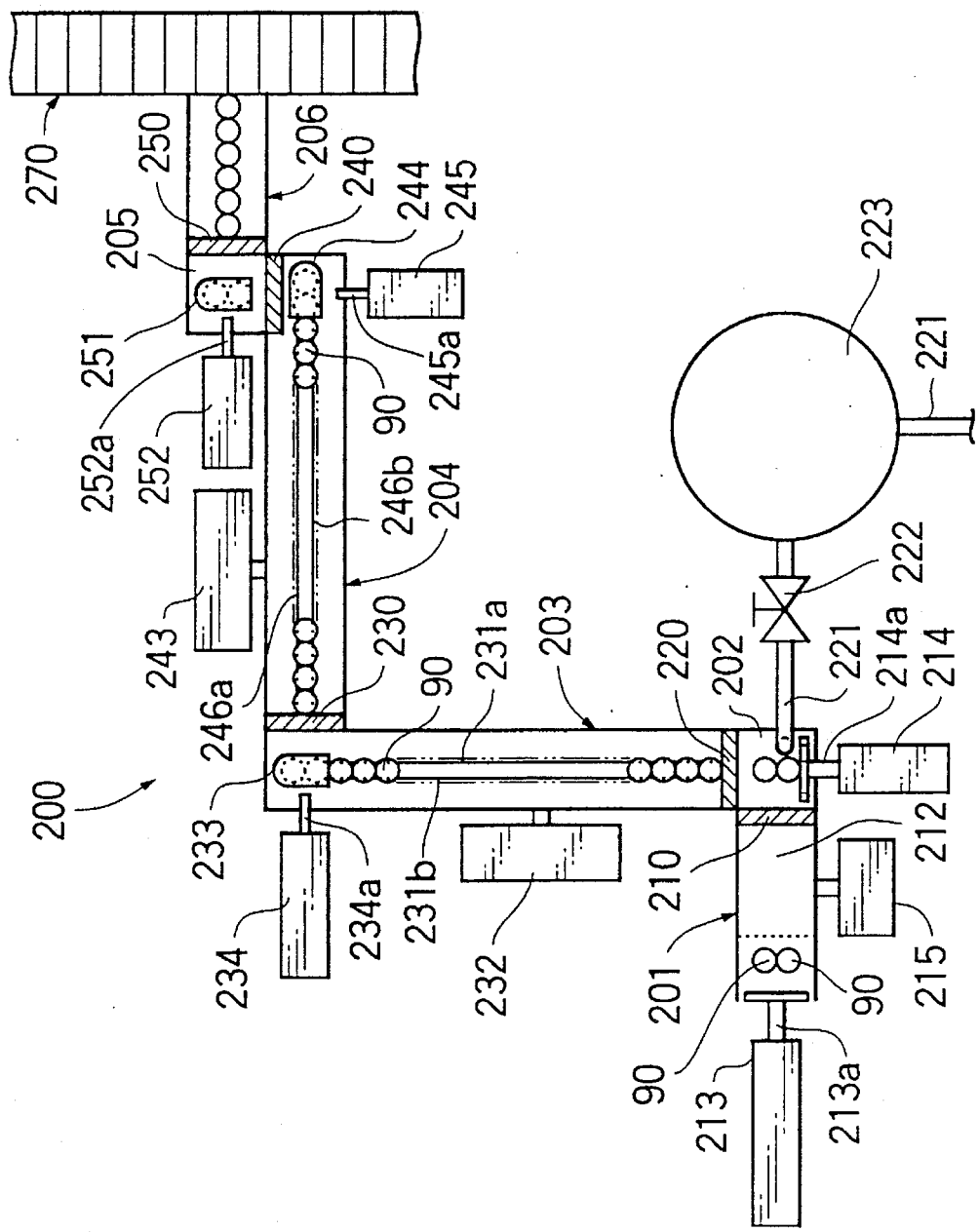
FIG. 6 is a schematic plan view of a second embodiment of food sterilizing apparatus according to the invention, showing its overall configuration.

As seen from FIGS. 1 and 6, the food sterilizing apparatuses 100 and 200 are different in the way that the food feeding sections 1 and 201, the heating and sterilizing chambers 3 and 203 and the cooling chambers 4 and 204 are connected. In the food sterilizing apparatus 100, the food feeding section 1, the heating and sterilizing chamber 3 and the cooling chamber 4 are arranged and connected in such a way that the directions along which trays are advanced respectively in the food feeding section 1, the heating and sterilizing chamber 3 and the cooling chamber 4 are parallel to each other and, therefore, a pair of trays are transferred forward at the junctions by means of a pair of pusher devices (e.g., 14 and 26) and a turn table (e.g., 24) such that they appear like a "crank" there.

On the other hand, in the food sterilizing apparatus 200, the food feeding section 201 and the heating and sterilizing chamber 203 are arranged perpendicularly relative to each other, so that trays moving therethrough turn rectangularly at the junction thereof. Likewise, the heating and sterilizing chamber 203 and the cooling chamber 204 are arranged perpendicularly relative to each other so that trays moving therethrough turn rectangularly again at the junction thereof.

As a result, the pressure upward regulating chamber 202 does not require a turn table for the operation of the food sterilizing apparatus 200 while the junctions require only single pusher devices (214, 234, respectively) in order to transfer trays forward.

FIG. 6 shows only schematically a steam supply means and deaerating means for exhausting the steam and/or air from the preheated chamber 12 that are fitted to the preheating chamber 12 of the food feeding section 201 and collectively denoted by reference numeral 216 and operate to preheat the trays in the chamber and form a steam/air curtain that runs along the lateral wall of the preheating chamber 212 where the first gate valve 210 is arranged.

Figure 7:
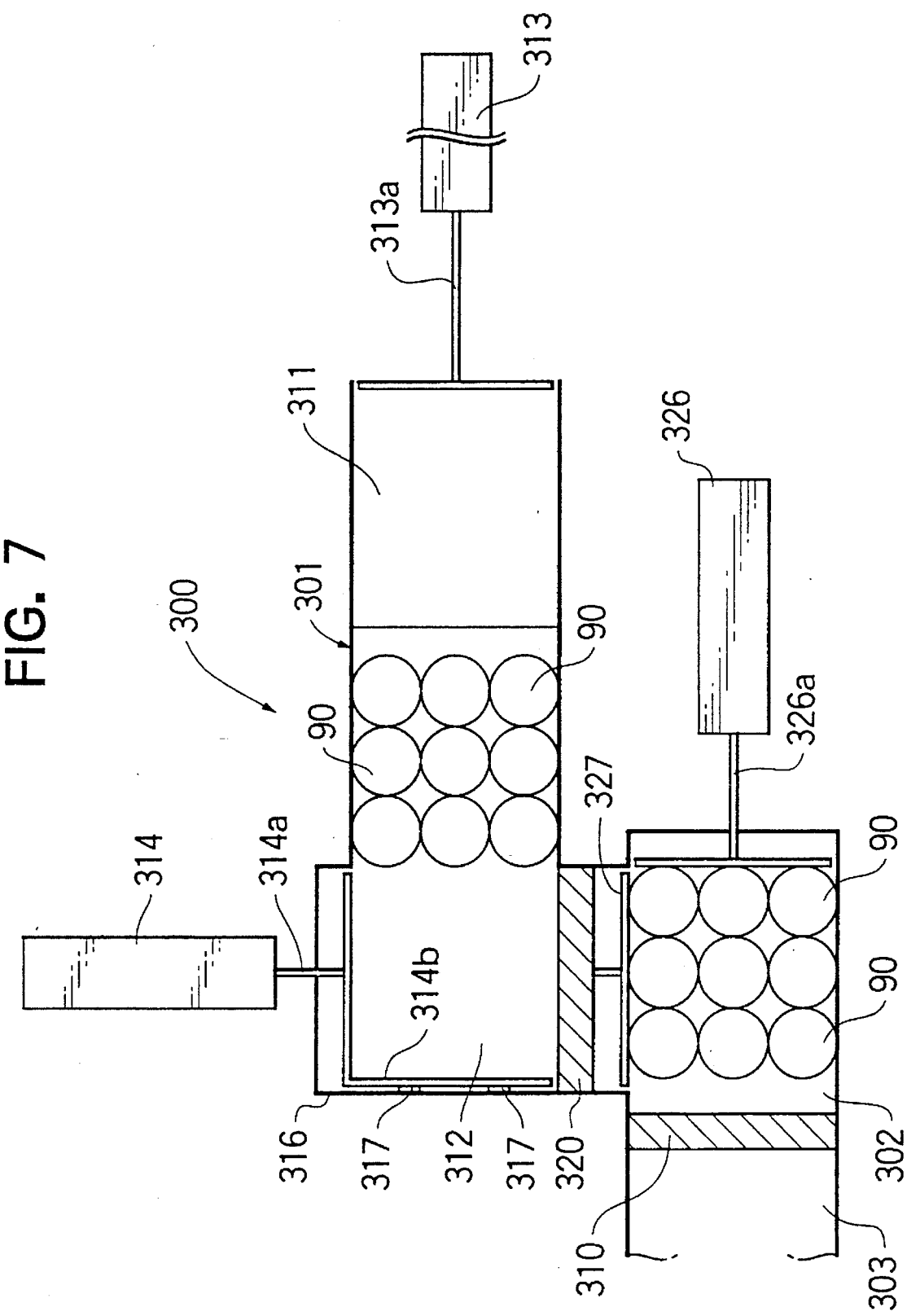
FIG. 7 is a schematic plan view of a third embodiment of food sterilizing apparatus according to the invention, showing only its preheating chamber and pressure upward regulating chamber.
Figure 8:
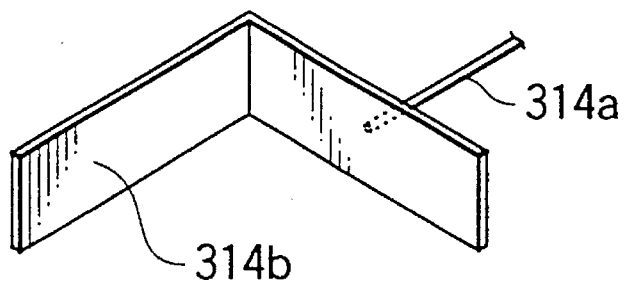
FIG. 8 is a schematic perspective view of the second pusher device of the third embodiment of food sterilizing apparatus according to the invention.

FIG. 7 schematically shows an upstream area of a food sterilizing apparatus 300 obtained by modifying the first and second embodiments of food sterilizing apparatus 100, 200. The components are common to all the embodiments are denoted by the same reference numerals prefixed by 3 or 30 and will not be described any further. As illustrated earlier, a pair of trays 90, 90 are rearranged into a row and transferred forward at each junction in the first and second embodiments. Contrary to this, a total of nine (9) trays are arranged into a matrix (3 rows×3 columns) to form a unit, which is transferred to downstream sections by means of pusher devices (313, 314, 416 and so on) in this embodiment. This arrangement does not require any turn table at the junctions.

Instead, the front end portion of the pusher rod 314a of the second pusher device 314 is hooked to have an L-shaped profile in order to push forward trays arranged into a matrix of 3 rows×3 columns (FIG. 7). Thus, the trays moved to the downstream end of the preheating chamber 312 by the T-shaped rod 313a of the first pusher device 313 are thereafter pushed toward the pressure upward regulating chamber 302 by the rod 314a having an L-shaped front end portion, maintaining the matrix arrangement of 3 rows×3 columns. The wall at the downstream end of the preheating chamber 312 disposed vis-a-vis the rising section 314b of the L-shaped front end portion of the pusher rod 314a is provided with a pair of receiving sections 317, 317 comprising respective pads. These receiving sections 317, 317 are intended to prevent the rising section 314b of the L-shaped front end portion of the pusher rod 314a of the second pusher device 314 from being deformed when nine trays are pushed against the pusher rod 314a by the pusher rod 313a of the first pusher device 313.

Figure 9:
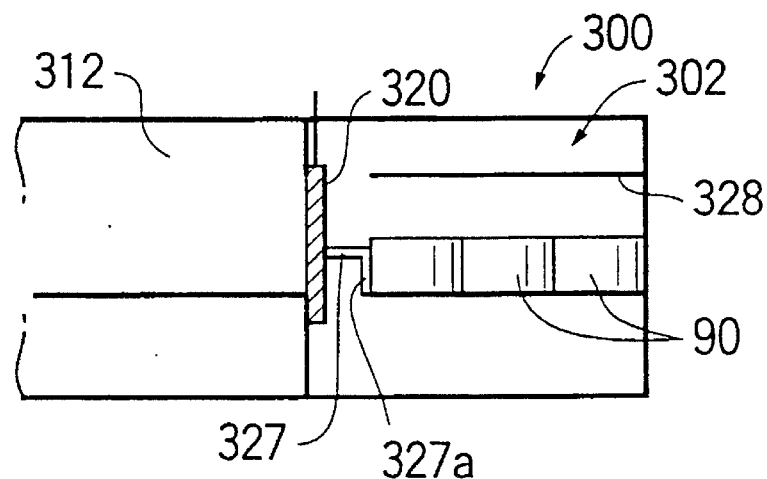
FIG. 9 is a schematic longitudinal cross sectional view of the pressure upward regulating chamber of the third embodiment of food sterilizing apparatus according to the invention.

The front end of the pusher rod 326a of the third pusher device 326 is T-shaped and designed to move nine trays arranged to a matrix of 3 rows×3 columns into the heating and sterilizing chamber 303. Additionally, a T-shaped alignment member 327 is arranged between the preheating chamber 312 and the pressure upward regulating chamber 302 and at the side of the gate valve 320 located close to the pressure upward regulating chamber 302. The lining-up member 327 has a downwardly bent section 327a arranged substantially in parallel with the gate valve 310 (See FIG. 9). The lining-up member 327 cooperates with the T-shaped front end of the pusher rod 326a of the third pusher device 326 to prevent any disorderly movement of trays from taking place while they are pushed toward the heating and sterilizing chamber 303. Thus, the nine trays arranged to a matrix of 3 rows ×3 columns are conveyed from the pressure upward regulating chamber 302 to the heating and sterilizing chamber 303 without losing their neat and orderly arrangement because of the cooperation of the T-shaped front end of the pusher rod 326a and the alignment member 327.

A shield plate 328 is arranged in the pressure upward regulating chamber 302. The shield plate 328 is located between the open end of the steam supply pipe (not shown) in the pressure upward regulating chamber 302 and the open tops 93 of the trays 90 housed in the pressure upward regulating chamber 302 to prevent steam blown out of the steam supply pipe from directly hitting the food in the trays 90.

Figure 10:
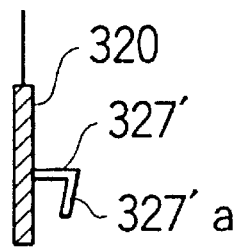
FIG. 10 is a schematic longitudinal cross sectional view of a modified lining-up member to be used for the pressure upward regulating chamber of the third embodiment of food sterilizing apparatus according to the invention.

The downwardly bent section 327a of the alignment member 327 may be replaced by an alternative downwardly bent section 327'a that gradually comes close to the gate valve 320 as shown in FIG. 10.

Note that the pusher devices of the third embodiment have a stroke long enough to push trays arranged in 3 rows ×3 columns into the subsequent component.

While the present invention has been described in terms of a food sterilizing apparatus designed to sterilize food contained in trays as shown in FIG. 2, it is not limited thereto and may also be used to sterilize food contained in sealed containers.

As described above in detail, since a food sterilizing apparatus according to the invention can significantly reduce the time required for raising the inner pressure (or the inner pressure and the temperature) of the pressure upward regulating chamber to the level of the inner pressure (or the inner pressure and the temperature) of the heating and sterilizing chamber, the food sterilizing apparatus can be operated with a remarkably enhanced efficiency.

What is claimed is:

1. A food sterilizing apparatus comprising:

a food feeding section in communication with an atmosphere having a pressure, said food feeding section having an upstream end and a downstream end, said upstream end receiving open containers containing food to be heated and sterilized;

a heating and sterilizing chamber for heating and sterilizing the food under pressure higher than the atmospheric pressure, said heating and sterilizing chamber having an upstream end and a downstream end;

a pressure upward regulating chamber provided between said downstream end of said food feeding section and said upstream end of said heating and sterilizing chamber;

a first sealing gate separating said pressure upward regulating chamber from said downstream end of said food feeding section;

a second sealing gate separating said pressure upward regulating chamber from said upstream end of said heating and sterilizing chamber;

means for successively advancing the open containers from said food feeding section to said heating and sterilizing chamber;

a pressurized fluid tank for storing a pressurized fluid;

a pipe providing fluid communication between said pressurized fluid tank and said pressure upward regulating chamber, said pipe having an open end opening into said pressure upward regulating chamber;

pressurized fluid blocking means provided between said open end of said pipe and openings of the open containers; and a pressurized fluid supply source for supplying pressurized fluid to said pressurized fluid tank.

2. a food sterilizing apparatus according to claim 1, wherein said open container is a cylindrical container having top opening a and bottom plate and said pressurized fluid blocking means includes a shield section for covering the openings of said open containers.

3. A food sterilizing apparatus comprising:

a food feeding section in communication with an atmosphere having a pressure, said food feeding section having an upstream end and a downstream end, said upstream end receiving open, rigid containers containing food to be heated and sterilized, the open, rigid containers having a width;

a heating and sterilizing chamber for heating and sterilizing the food under pressure higher than the atmospheric pressure, said heating and sterilizing chamber having an upstream end and a downstream end;

a pressure upward regulating chamber provided between said downstream end of said food feeding section and said upstream end of said heating and sterilizing chamber;

a cooling chamber for cooling the heated and sterilized food, said cooling chamber having an upstream end and a downstream end, said upstream end of said cooling chamber being adjacent said downstream end of said heating and sterilizing chamber;

a delivery section having an upstream end and a downstream end, said downstream end discharging the food in the containers;

a pressure downward regulating chamber provided between said downstream end of said cooling chamber and said upstream end of said delivery section;

a first sealing gate connecting said pressure upward regulating chamber with said downstream end of said food feeding section;

a second sealing gate connecting said pressure upward regulating chamber with said upstream end of said heating and sterilizing chamber;

a third sealing gate connecting upstream end of said cooling chamber with said downstream end of said heating and sterilizing chamber;

a fourth sealing gate connecting said pressure downward regulating chamber with said downstream end of said cooling chamber;

a fifth sealing gate connecting said pressure downward regulating chamber with said upstream end of said delivery section;

means for successively advancing the open, rigid containers from said food feeding section to said heating and sterilizing chamber;

first, second, third, fourth, fifth, and sixth pusher devices provided at said upstream ends of said food feeding section, said pressure upward regulating chamber, said heating and sterilizing chamber, said cooling chamber, said pressure downward regulating chamber, and said delivery section, respectively, for pushing the rigid, open containers downstream, each of said pusher devices having a stroke equal to or greater than the width of one of the rigid, open containers;

a pressurized fluid tank for storing a pressurized fluid, said tank being in fluid communication with said pressure upward regulating chamber; and a pressurized fluid supply source for supplying pressurized fluid to said pressurized fluid tank.

4. A food sterilizing apparatus according to claim 3, wherein said pressurized fluid tank has a capacity 10 to 30 times greater than that of said pressure upward regulating chamber.

5. A food sterilizing apparatus according to claim 3, wherein said food feeding section, said heating and sterilizing chamber, said cooling chamber, and said delivery section are arranged perpendicularly relative to each other.

6. A food sterilizing apparatus according to claim 3, wherein said food feeding section, said heating and sterilizing chamber, said cooling chamber, and said delivery section are arranged parallel with each other.

7. A food sterilizing apparatus according to claim 3, further comprising:

a pipe providing fluid communication between said pressurized fluid tank and said pressure upward regulating chamber, said pipe having an open end opening into said pressure upward regulating chamber; and pressurized fluid blocking means provided between said open end of said pipe and openings of the rigid, open containers.

8. A food sterilizing apparatus according to claim 7, wherein said open container is a cylindrical container having a respective top opening a and bottom plate and said pressurized fluid blocking means includes a shield section for covering the opening of said open containers.

9. A food sterilizing apparatus according to claim 7, wherein said pressurized fluid blocking means is a box-like turn table for containing said rigid containers.

10. A food sterilizing apparatus comprising:

a food feeding section in communication with an atmosphere having a pressure, said food feeding section having a downstream end;

a heating and sterilizing chamber for heating and sterilizing food under pressure higher than the atmospheric pressure, said heating and sterilizing chamber having an upstream end and a downstream end;

a pressure upward regulating chamber provided between said downstream end of said food feeding section and said upstream end of said heating and sterilizing chamber;

a first sealing gate separating said pressure upward regulating chamber from said downstream end of said food feeding section, said first sealing gate having a food feeding section side and a pressure upward regulating chamber side;

a second sealing gate separating said pressure upward regulating chamber from said upstream end of said heating and sterilizing chamber; and steam air-curtain forming means for forming a steam air-curtain, said steam air-curtain forming means being arranged at said food feeding section side of said first sealing gate.

11. A food sterilizing apparatus according to claim 10, wherein said air curtain forming means comprises a steam supply means for supplying steam to said food feeding section and a deaerating means for exhausting the steam from said food feeding section.

12. A food sterilizing apparatus according to claim 10, wherein said air curtain is flowing along said first sealing gate.

13. A food sterilizing apparatus according to claim 12, wherein said air curtain forming means includes a steam supply means for supplying steam to said food feeding section and a deaerating means for exhausting steam from said food feeding section.

14. A food sterilizing apparatus comprising:

a food feeding section in communication with an atmosphere having a pressure, said food feeding section having an upstream end and a downstream end, said upstream end receiving open, rigid containers containing food to be heated and sterilized, the open, rigid containers having a width;

a heating and sterilizing chamber for heating and sterilizing the food under pressure higher than the atmospheric pressure, said heating and sterilizing chamber having an upstream end and a downstream end;

a pressure upward regulating chamber provided between said downstream end of said food feeding section and said upstream end of said heating and sterilizing chamber;

a cooling chamber for cooling the heated and sterilized food, said cooling chamber having an upstream end and a downstream end, said upstream end of said cooling chamber being adjacent said downstream end of said heating and sterilizing chamber;

a delivery section having an upstream end and a downstream end, said downstream end discharging the food in the containers;

a pressure downward regulating chamber provided between said downstream end of said cooling chamber and said upstream end of said delivery section;

a first sealing gate connecting said pressure upward regulating chamber with said downstream end of said food feeding section, said first sealing gate having a food feeding section side and a pressure upward regulating chamber side;

a second sealing gate connecting said pressure upward regulating chamber with said upstream end of said heating and sterilizing chamber;

a third sealing gate connecting upstream end of said cooling chamber with said downstream end of said heating and sterilizing chamber;

a fourth sealing gate connecting said pressure downward regulating chamber with said downstream end of said cooling chamber;

a fifth sealing gate connecting said pressure downward regulating chamber with said upstream end of said delivery section;

means for successively advancing the open, rigid containers from said food feeding section to said heating and sterilizing chamber;

first, second, third, fourth, fifth, and sixth pusher devices provided at said upstream ends of said food feeding section, said pressure upward regulating chamber, said heating and sterilizing chamber, said cooling chamber, said pressure downward regulating chamber, and said delivery section, respectively, for pushing the rigid, open containers downstream, each of said pusher devices having a stroke equal to or greater than the width of one of the rigid, open containers; and steam air-curtain forming means for forming a steam air-curtain, said steam air-curtain forming means being arranged at said food feeding section side of said first sealing gate.

15. A food sterilizing apparatus according to claim 14, wherein said air curtain forming means includes a steam supply means for supplying steam to said food feeding section and a deaerating means for exhausting steam from said food feeding section.

16. A food sterilizing apparatus according to claim 15, wherein said steam supply means includes a steam blow out port, and wherein said apparatus further comprises a deflector plate arranged at a position opposite said steam blow out port of said steam supply means for leading steam to said deaerating means.

17. A food sterilizing apparatus according to claim 14, wherein said food feeding section, said heating and sterilizing chamber, said cooling chamber, and said delivery section are arranged perpendicularly relative to each other.

18. A food sterilizing apparatus according to claim 14, wherein said food feeding section, said heating and sterilizing chamber, said cooling chamber, and said delivery section are arranged parallel with each other.

* * * * *